(No Model.) 2 Sheets—Sheet 1.
F. A. CAMP & F. G. CORSER.
BOILER.
No. 400,051. Patented Mar. 26, 1889.
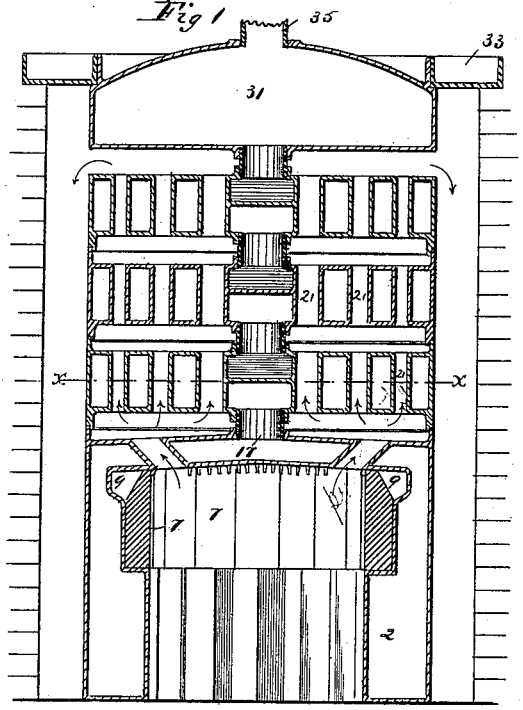
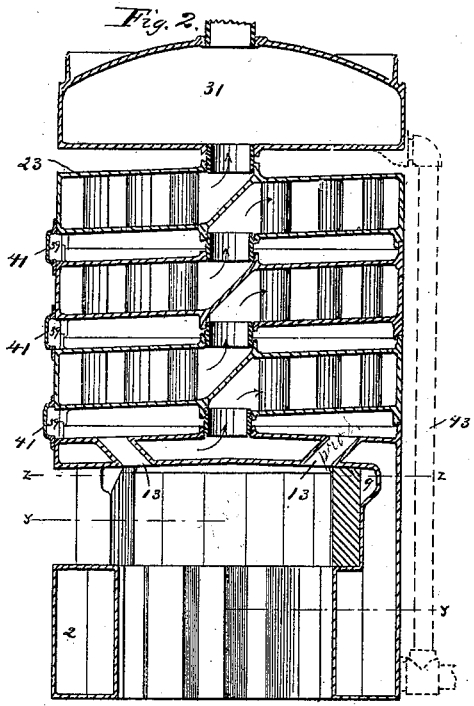
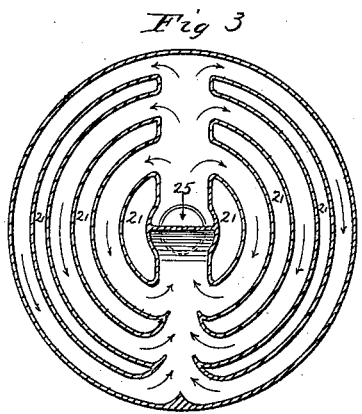
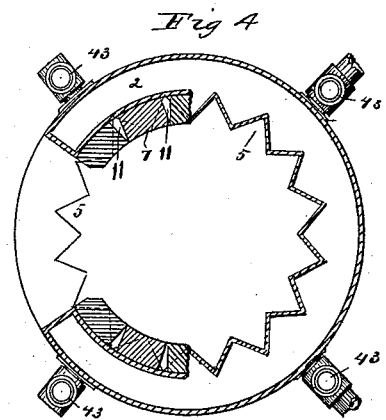
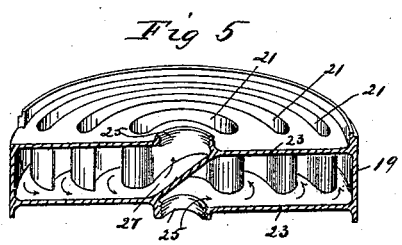
Witnesses.
Clara Nachtrieb.
J. Jessen.
Inventors
Frederic A. Camp
Frederic G. Corser
By Paul, Sanford & Merwin Att'ys (No Model.) 2 Sheets—Sheet 2.

F. A. CAMP & F. G. CORSER.
BOILER.

No. 400,051. Patented Mar. 26, 1889.

Witnesses.
Clara Nachtrieb,
J. Jensen

Inventors
Frederic A. Camp,
Frederic G. Corser,
By Paul, Sanford & Merwin Attys.

N. PETERS, Photo-Lithographer, Washington, D. C.

UNITED STATES PATENT OFFICE.

FREDERIC A. CAMP AND FREDERIC G. CORSER, OF MINNEAPOLIS, MINNESOTA.

BOILER.

SPECIFICATION forming part of Letters Patent No. 400,051, dated March 26, 1889.

Application filed May 18, 1888. Serial No. 274,253. (No model.)

*To all whom it may concern:*

Be it known that we, FREDERIC A. CAMP and FREDERIC G. CORSER, of Minneapolis, county of Hennepin, and State of Minnesota, have invented certain Improvements in Boilers, of which the following is a specification.

Our invention relates particularly to improvements in hot water or steam heating apparatus.

The objects that we have in view are, generally, to provide an improved construction of a boiler that may be used either for hot water or steam heating, and in which a positive circulation of the water will be secured.

Another object is to provide a sectional boiler, the sections of which may be secured together by a single screw-joint.

Other objects of the invention will appear from the following detailed descriptions, taken in connection with the accompanying drawings, in which—

Figure 6:
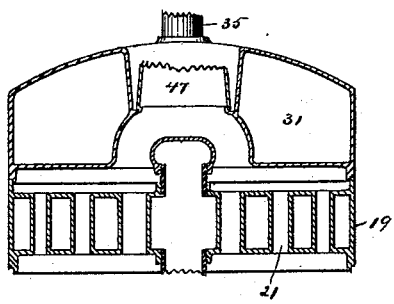
Figure 7:
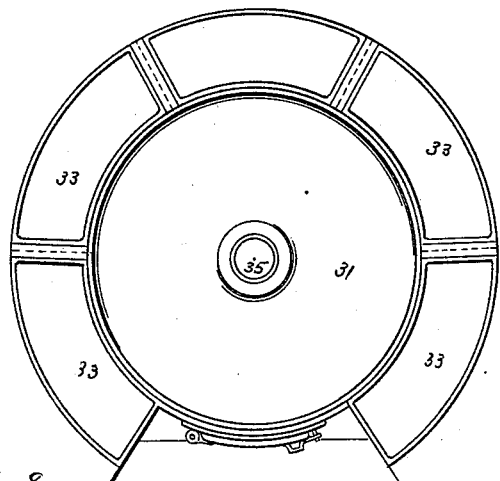
Figure 8:
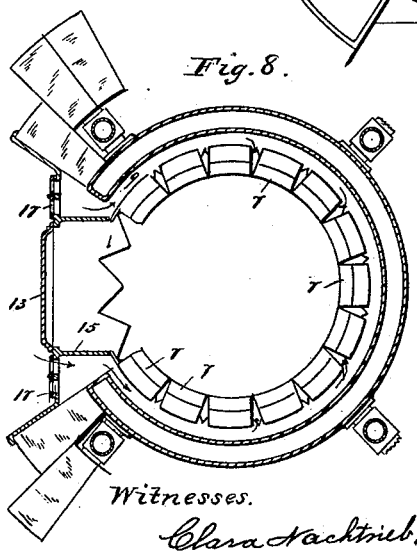
Figure 9:
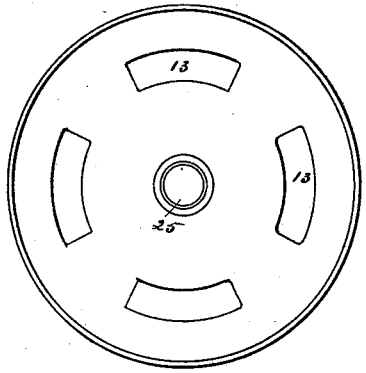

Figure 1 is a central vertical section of a heater constructed in accordance with our invention. Fig. 2 is a similar view taken on a plane at right angles to Fig. 1. Fig. 3 is a horizontal section on line $x\ x$ of Fig. 1. Fig. 4 is a horizontal section on line $y\ y$ of Fig. 2. Fig. 5 is a perspective view of one-half of a boiler-section. Fig. 6 is a detail showing a modification. Fig. 7 is a plan. Fig. 8 is a section on line $z\ z$ of Fig. 2. Fig. 9 is a plan of the top of the fire-box with the boiler-sections removed.

Our heater is composed, generally, of a water-jacketed furnace and a number of boiler-sections, which are secured to each other and to the water-jacket of the furnace, preferably, by a single joint centrally arranged. The boiler-sections are of peculiar construction, and are arranged so as to secure a positive circulation of the water through them and provide a series of flues for the passage of the products of combustion from the furnace.

In the accompanying drawings, 2 represents the water-jacket of the furnace. It is preferably of a substantially circular form, and is provided at one side in its upper portion with an opening, which forms the fire-door of the furnace. The lower portion of the water-jacket is preferably provided on its inner surface with a series of vertical corrugations or channels, 5, which are here shown V-shaped in cross-section, but which may be of any preferred size and shape. These channels, preferably, extend only to the height of the bottom of the furnace-door, and above them the furnace is provided with a lining of fire-brick, 7. An annular recess, 9, is preferably formed in the top of the inner surface of the water-jacket 2, extending from the opening for the furnace-door entirely around the furnace outside of the lining, which is preferably arranged in the upper part of the furnace and rests upon the projecting portions of the water-jacket that are between and form the channels 5. This lining is preferably formed of a series of fire-brick, 7; but any other suitable lining may be used instead. The recess 9 might, as an obvious equivalent, be formed entirely in the lining, or part in the lining and part in the water-jacket. Openings 11 are provided in the furnace-lining, and they form passages from the annular recess 9 into the vertical channels 5. These passages 11 may be formed between the brick 7; or they may be formed as grooves, holes, or recesses in them.

The furnace is preferably provided with a suitable door, 13, secured upon the frame 15, which is arranged in the opening in front of the water-jacket. Upon each side of the door 13 is an opening, which may be provided with a cut-off or damper, 17, and communicates with the recess 9. When the slides or dampers 17 are open, currents of air enter the openings at the sides of the door and pass into and around in the annular recess 9, and down through the spaces 11 between the fire-brick 7, and through the channels 5 into the combustion-chamber. Any suitable arrangement of openings may be used to lead the air into the recess 9. The water-jacket extends over the top of the combustion-chamber, and is provided with any desired number of flues 13, which lead from the combustion-chamber into the flues formed in the boiler-sections, hereinafter described. The top of the water-jacket is also provided with a central opening, 25, which is preferably screw-threaded, and is adapted to receive the threaded coupling, as shown in Figs. 1 and 2.

Any desired number of boiler-sections 19 may be arranged above the furnace and be coupled together in any suitable manner. These sections are preferably of substantially circular form, and they are each provided with two series of vertical flues, 21, each of which is preferably of curved form in horizontal cross-section, substantially as shown in Fig. 3. The top and bottom of the sections 19 are formed by the plates 23, as shown in Figs. 3 and 5. The flues 21 are preferably nearly of semicircular form, and are arranged upon opposite sides of the center of the section. Curved water-spaces are thus formed between the flues in each section, as shown in Fig. 3. A central opening, 25, is formed in the top and bottom of each section. These openings are preferably screw-threaded, and threaded nipples are shown as forming the connections between the sections. Any suitable devices may be used, however, to couple the sections. A diaphragm, 27, extends from the top to the bottom of each section between the inner flues, as shown in Figs. 3 and 5. This diaphragm extends across between the two inner flues and between the openings in the top and bottom of the section. There is therefore no communication from one of these openings to the other through the section, except through the spaces between the vertical flues 21. Water entering the bottom opening, 25, must therefore pass around through these water-spaces upward over the diaphragm 27 and out through the opening at the top of the section. The top and bottom wall of the section are preferably formed inclined, so that the water-space is slightly inclined upward from the bottom opening around to the top opening, for the purpose hereinafter set forth. The edges of the section may project a short distance above and below the top and bottom plates, as drawn, so that when two or more sections are placed together the edges which are in contact with each other keep the sections a short distance apart. A similar coupling is also used to secure the lower section to the water-jacket of the furnace and to secure the dome 31 to the top section. The sections are arranged, preferably, with all of the diaphrams 27 parallel with each other, as shown in Fig. 2. The products of combustion from the combustion-chamber pass through the flues 13 upward between the sections and through the flues 21 until they reach the bottom of the dome, by which they are deflected and pass out horizontally between the upper section and the dome 31, as indicated in Fig. 1. The heater is preferably set in suitable brick masonry and generally with a space between the outside of the heater and the brickwork, forming a diving-flue, through which the products of combustion pass on their way to the smoke-stack. We prefer to provide plates 33, each of which is in the form of a segment of a circle, and is provided with side walls forming a shallow trough, which may be filled with suitable non-conducting material. These plates are arranged to cover the annular space between the brick-work and the wall of the heater, as shown in Figs. 1 and 7. The steam or hot-water-flow pipe is preferably connected to the top of the dome, as shown in Figs. 1 and 2. The heater is also preferably provided directly over the fire-door with openings 39, through which access may be had to the spaces between the sections for the purpose of cleaning the flues. Caps or doors are secured over these openings.

When the heater is used in steam-heating apparatus, an equalizing-pipe, 43, is preferably connected to the dome 31, and also to the lower part of the water-jacket. If preferred, a series of these pipes may be used, as shown in Figs. 4 and 8. In some instances, where it is desired to obtain a direct draft from the heater, the dome 31 may be provided with a central opening, and the steam-pipe 35 may be arranged at one side thereof. The flues of the upper boiler-section will in this instance connect directly with the central opening through the dome 31, and the smoke-pipe 47 may be arranged to carry off the products of combustion through the opening in the dome 31. The top of the dome is depressed and receives the smoke-pipe 47 at a point below the water-line. The upward incline of the water-spaces prevents the accumulation of air or steam in any part of the boiler.

The boiler-sections may be made and sold separately, and may be used wherever it is desired to secure a positive circulation of water or steam. They may be used also for radiator-sections, as well as for boiler or heater sections.

The operation of the heating apparatus will be readily understood from the foregoing detailed description. An especial advantage is obtained from the construction which permits the current of air to be passed around inside of the water-jacket and behind the lining and then into the combustion-chamber. This air becomes heated to a high temperature before it enters the combustion-chamber, and it therefore aids in the combustion instead of retarding it, as it would do if passed directly to the combustion-chamber before becoming heated. A positive circulation of the water is obtained through the boiler. It passes up through the opening in the bottom of each section, passes around through the water-spaces between the flues to the other side of the diaphragm, and then passes out through the opening in the top of the section into the next succeeding section, and so on through the boiler. The sections may be very readily put together and secured as they are connected only by a single joint, which is arranged at or near the center of the section. After the threads of the couplings have been entered into the threaded openings in the sections, the parts are easily secured by turning one section upon the other. If it is desired to increase the capacity of the boiler, it is merely necessary to add to it one or more sections.

Besides these advantages our heater is very compact and durable and simple in construction. We do not in this application claim the described constructions of the furnace, having claimed the same in another application for Letters Patent, Serial No. 282,247, filed August 8, 1888, filed as a division hereof.

What we claim, and desire to secure by Letters Patent, is—

1. As a new article of manufacture, the herein-described heater-section consisting of the outer wall, the top and bottom plates, each provided with a single central opening, a series of flues extending through said top and bottom plates upon opposite sides of said opening, and a diaphragm extending from the top plate on one side of the top opening to the bottom plate on the other side of the bottom opening.

2. As a new article of manufacture, the herein-described heater-section consisting of the outer wall, the top and bottom plates, each provided with a single opening, the two series of flues extending through said top and bottom plates, and the diaphragm extending from the top plate on one side of its opening to the bottom plate on the other side of its opening and between the two inner flues, substantially as described.

3. The combination, in a heater, of the water-jacket provided with a central single opening, the series of heater-sections, each provided with a single central opening at its top and bottom, and the diaphragm extending from the top of the section on one side of the opening to the bottom of the section on the opposite side, and the threaded couplings connecting said sections and connecting the lower section and the water-jacket, substantially as described.

4. The combination, in a heater of the class described, of the series of sections, each provided with a central threaded opening in its top and bottom and with an inclined diaphragm extending from the top of the section on one side of the opening to the bottom of the section upon the opposite side of the opening, and the threaded couplings securing said sections together, substantially as described.

5. The combination, in a heater of the class described, of a series of sections, each provided with inclined top and bottom walls and with an opening in each of the walls, a diaphragm extending from the top wall on one side of its opening to the bottom wall on the opposite side of its opening, a series of flues extending through each of the sections, and means for securing all of said sections together, substantially as described.

6. The combination, in a heater of the class described, of the series of sections secured together and communicating with each other, each provided with a single central opening in its top and bottom, a diaphragm arranged between said openings and with inclined top and bottom walls forming an upwardly-inclined space from the bottom opening to the top opening, and flues extending through said sections, for the purpose set forth.

In testimony whereof we have hereunto set our hands this 12th day of May, 1888.

FREDERIC A. CAMP.
FREDERIC G. CORSER.

In presence of—
A. C. PAUL,
J. JESSEN.